Figure 1:
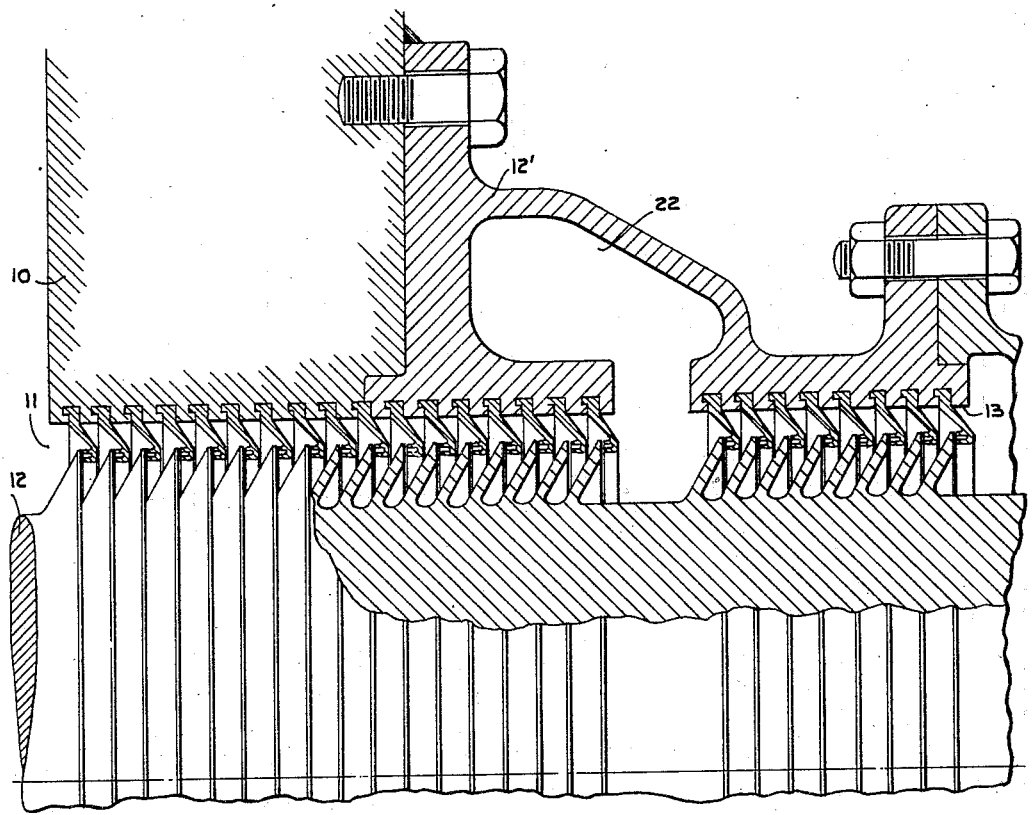

June 16, 1931.  F. HODGKINSON  1,810,372

LABYRINTH PACKING

Filed Oct. 9, 1928

WITNESS
E. Lutz

INVENTOR
F. Hodgkinson
BY
A. B. Reavis
ATTORNEY

Patented June 16, 1931

1,810,372

UNITED STATES PATENT OFFICE

FRANCIS HODGKINSON, OF PHILADELPHIA, PENNSYLVANIA, ASSIGNOR TO WESTINGHOUSE ELECTRIC & MANUFACTURING COMPANY, A CORPORATION OF PENNSYLVANIA

LABYRINTH PACKING

Application filed October 9, 1928. Serial No. 311,345.

My invention relates to labyrinth packing for sealing the space between two relatively rotatable members, and has for its object to provide a packing of the character designated wherein the packing clearances may be adjusted in operation and wherein the packing elements are so constructed as to move in a clearance-increasing direction in case of accidental rubbing and heating.

In the design of steam turbines in which labyrinth packings are employed, as, for example, the packing of the opening in the casing through which the rotor shaft passes, the packing between diaphragms and the rotor, the packing between rotor and stator of revolving balance pistons, etc., it is desirable that the clearances between the elements of such labyrinth packings be maintained a minimum when the turbine is in normal operation, as the efficiency of the turbine is to some extent dependent thereon. In starting a steam turbine and imposing load thereon, there are abnormal variations and differences of temperature between the respective stationary and moving elements which affect the axial clearances between the labyrinth elements. It is, therefore, desirable to employ a labyrinth whose axial clearances may be adjusted with the turbine in operation, so that they may be adjusted to a comparatively wide clearance during the starting and stopping operations and until normal temperature conditions of the machine have obtained, then reducing the clearances to the minimum. This is for the purpose of eliminating the possibility of injury to the labyrinth strips because of coming in contact with each other under abnormal temperature differences on the one hand, and on the other, to secure a reliably operative small clearance during normal operating conditions of load.

In accordance with my invention, I provide a packing element secured to one of the relatively rotatable members and packing axially against a cooperating part of the other relatively rotatable member. The packing element is so arranged as to increase the clearance in case of accidental rubbing and heating. This packing element is preferably an annular conical strip secured at one edge to one of the relatively rotatable members and packing at its other or free edge axially against the other of said members. Upon heating of the free edge it expands and moves in a direction partly radial and partly axial. The free edge is so disposed relative to the cooperating part that this axial movement will be away from the cooperating part to increase the axial clearance.

Figure 2:
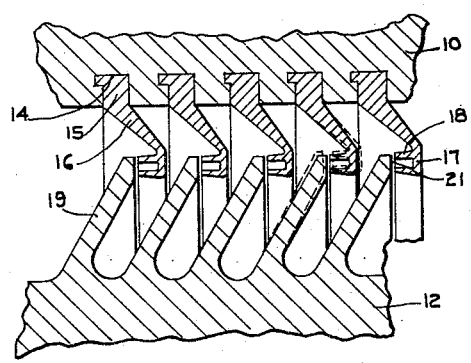

The above and other objects are effected by my invention, as will be apparent from the following description and claims taken in connection with the accompanying drawings, forming a part of this application, in which:

Fig. 1 is a longitudinal section through the portion of a steam turbine through which the shaft extends; and, Fig. 2 is an enlarged detail section of the packing elements.

For the purpose of illustration, I show my novel labyrinth packing applied to seal the space between the shaft opening of a turbine and the shaft extending therethrough. Obviously, it may be applied to any relatively rotatable members.

Referring now to the drawings in detail, I show a turbine casing 10 having a shaft opening 11 through which a rotor shaft 12 extends. A casing 12', having an interior cylindrical surface 13 forming an extension of the opening 11, may be secured to the turbine casing.

Stationary packing elements 16 are provided within the opening 11, and may be secured in any suitable manner. For example, they may be formed with root portions 15 secured in undercut grooves or recesses 14 around the opening 11, or they may be formed integrally with the casing.

The packing elements 16 are annular conical strips, extending from the secured edge in a direction which is radially inwardly and axially to the right as shown on the drawings. The inner edge of each element, designated at 17 on the drawings, is provided with one or more annular packing teeth 18, extending axially to the left. These packing elements may not be continuous rings, but may be cut up into a number of segments.

The shaft 12 is provided with corresponding or registering packing elements 19, which may be formed integral therewith as shown on the drawings or secured in any suitable manner. These packing elements extend from the shaft in a direction which is radially outward and axially to the right and terminate in radial faces 21, which pack against the packing teeth 18 with a close axial clearance therebetween.

The casing 12' may be provided with an annular leak-off chamber 22 from which a portion of the steam leaking through the labyrinth may be withdrawn, and, in the case of a turbine, may be conveyed to an appropriate pressure stage, as is well-known in the art.

The operation of the above described construction is as follows:

In starting the turbine, the rotor 12 is moved axially to the left to increase the packing clearances. The turbine may then be started and the rotor shaft may be subjected to expansions different relatively to the stator. When full speed is attained, and the temperature and other conditions have reached normal, it may be moved again to the right to decrease the clearance to the desired amount.

Should there be accidental contact of the packing teeth 18 with the packing faces 21, the heat generated in the free edges of both the stationary and rotating packing elements will cause them to expand. Expansion of the free edges 17 will result in a movement thereof in a direction which is partly radially and partly axially to the right, as is shown to an exaggerated extent in dotted lines in Fig. 2. The heating of the free edges of the rotating packing elements 19 will cause them to expand and to move in a direction which is partly radially outward and partly axially to the left, as is also shown to exaggerated extent in dotted lines in Fig. 2. It will be apparent, therefore, that the free edges or packing portions move away from each other to increase the axial clearance therebetween, thereby relieving the contacting pressure and avoiding further injury to the packing.

From the above description, it will be seen that I have provided a novel construction of packing which is particularly advantageous for high-pressure turbines. The axial clearances are easily adjustable in operation and can be adjusted to closer clearances with safety than has been hitherto possible with previous types of labyrinth. It will therefore be apparent that this type of packing is more effective and increases the efficiency of the turbine.

While I recognize that packing of the axial clearance type has heretofore been proposed, yet I am not aware of any packing of such type wherein provision is made for guarding against injury to the packing in case of accidental rubbing. By the construction above described, the clearances are automatically increased and any possibility of any injury beyond a slight wear is eliminated.

While I have shown my invention in but one form, it will be obvious to those skilled in the art that it is not so limited, but is susceptible of various changes and modifications without departing from the spirit thereof, and I desire therefore, that only such limitations shall be imposed thereupon as are imposed by the prior art or as are specifically set forth in the appended claims.

What I claim is:

1. In a labyrinth packing for sealing the space between two relatively rotatable members, an annular conical packing element carried by one of said members and having a free edge extending axially toward and packing against a part of the other member by axial clearance and so disposed as to move in the direction in which it increases said axial clearance in case of heating and expansion of the free edge.

2. In a labyrinth packing for two relatively rotatable members, the combination of an annular conical packing element secured at its inner edge to one of said members and having a free edge portion extending toward a part of the other member and cooperating therewith to form a seal by axial clearance, said free edge portion facing the cooperating part of the other member in the axial direction in which the packing element extends from the secured edge to the free edge, whereby said free edge portion will, upon expansion due to heating, move in a direction radially outwardly and axially away from the cooperating part to increase the axial clearance.

3. In a labyrinth packing for two relatively rotatable members, an annular conical packing element secured at its outer edge to one of said members and having its inner free edge portion extending toward a part of the other member and cooperating therewith to form a seal by axial clearance, said free edge portion extending axially toward and facing the cooperating part of the other member in the axial direction in which the packing element extends from the free edge to the secured edge, whereby said free edge will, upon expansion due to heating, move in a direction radially outwardly and axially away from the cooperating part to increase the clearance.

4. A labyrinth packing for sealing the space between two relatively rotatable members comprising an annular conical packing strip secured at its inner edge to one of said members, the outer edge thereof being free and being disposed adjacent a part of the other member with a close axial clearance therebetween, said cooperating part and clearance being on the radial side of said free edge on the inner side of the conical formation.

5. In a labyrinth packing for two relatively rotatable members, the combination of an annular conical packing element secured at its inner edge to one of said members and having its outer edge portion free, the latter being formed with a radial face on the side remote from the secured edge, and a second annular conical packing strip secured at its outer edge to the other member and having its inner edge portion free, the latter free edge portion packing axially against the radial face of the first-mentioned packing element, and both of said annular conical packing elements being disposed to converge in opposite axial directions.

6. The combination with two relatively rotatable members, of a labyrinth packing for sealing the space therebetween comprising annular conical packing elements carried by one member and extending therefrom in a direction partly radially outward and partly axial and terminating in radial packing faces, and other annular conical packing elements carried by the other member and extending therefrom in a direction partly radially inward and partly axial in the same axial direction as the first-mentioned packing elements and terminating in packing portions which pack axially against the radial faces of the first-mentioned packing elements.

7. The combination with two relatively rotatable members, of a labyrinth packing for sealing the space therebetween comprising annular conical packing elements carried by one member and extending therefrom in a direction partly radially outward and partly axial and terminating in radial packing faces, and other annular conical packing elements carried by the other member and extending therefrom in a direction partly radially inward and partly axial in the same axial direction as the first-mentioned packing elements, the inner edge portions of the second-mentioned packing elements being disposed axially opposite the radial faces of the first-mentioned packing elements and having packing teeth extending axially in close proximity thereto, whereby, in case of rubbing of said packing teeth and terminal parts and heating thereof, said parts will expand and move away from each other to increase the clearance therebetween.

8. A labyrinth packing for sealing the space between two relatively rotatable members comprising an annular conical packing element secured at one edge to one of said members, and a second annular conical packing element secured at one edge to the other of said members, said packing elements being so disposed relative to each other that the free edges thereof provide an axial packing clearance therebetween, each free edge packing on the side which is on the inner side of the conical formation of the packing element.

In testimony whereof, I have hereunto subscribed my name this 26th day of September, 1928.

FRANCIS HODGKINSON.